B. D. THOMAS.
DUAL CONTROL FOR AIRPLANES.
APPLICATION FILED JULY 3, 1919.
1,424,049.
Patented July 25, 1922.
2 SHEETS—SHEET 2.
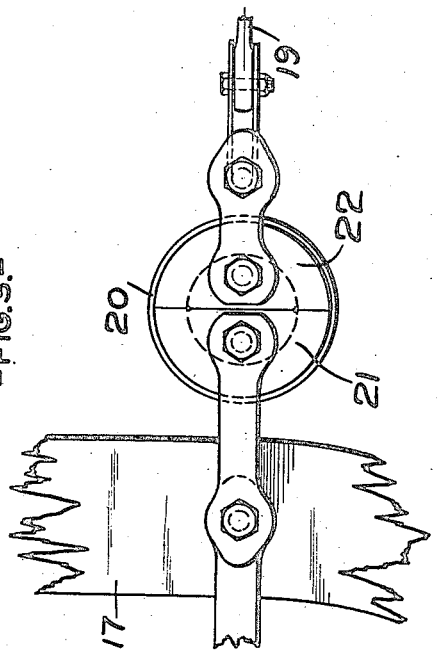
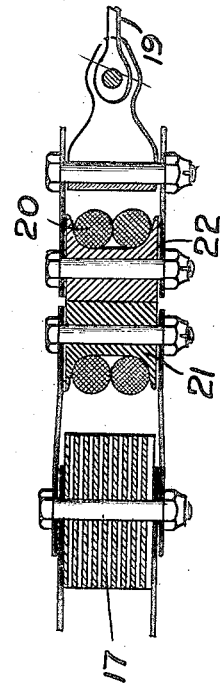
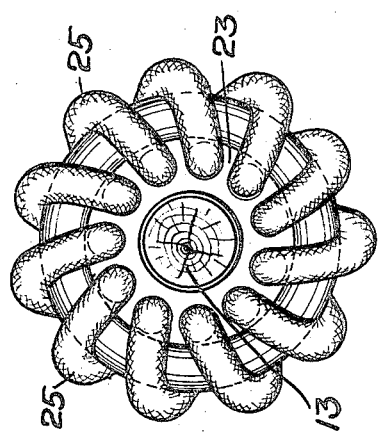
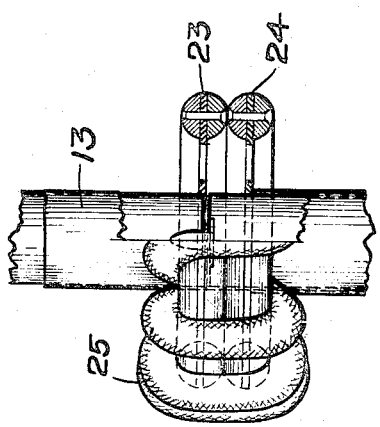
INVENTOR
Benjamin Douglas Thomas.
by Edward F. Wright
Atty.

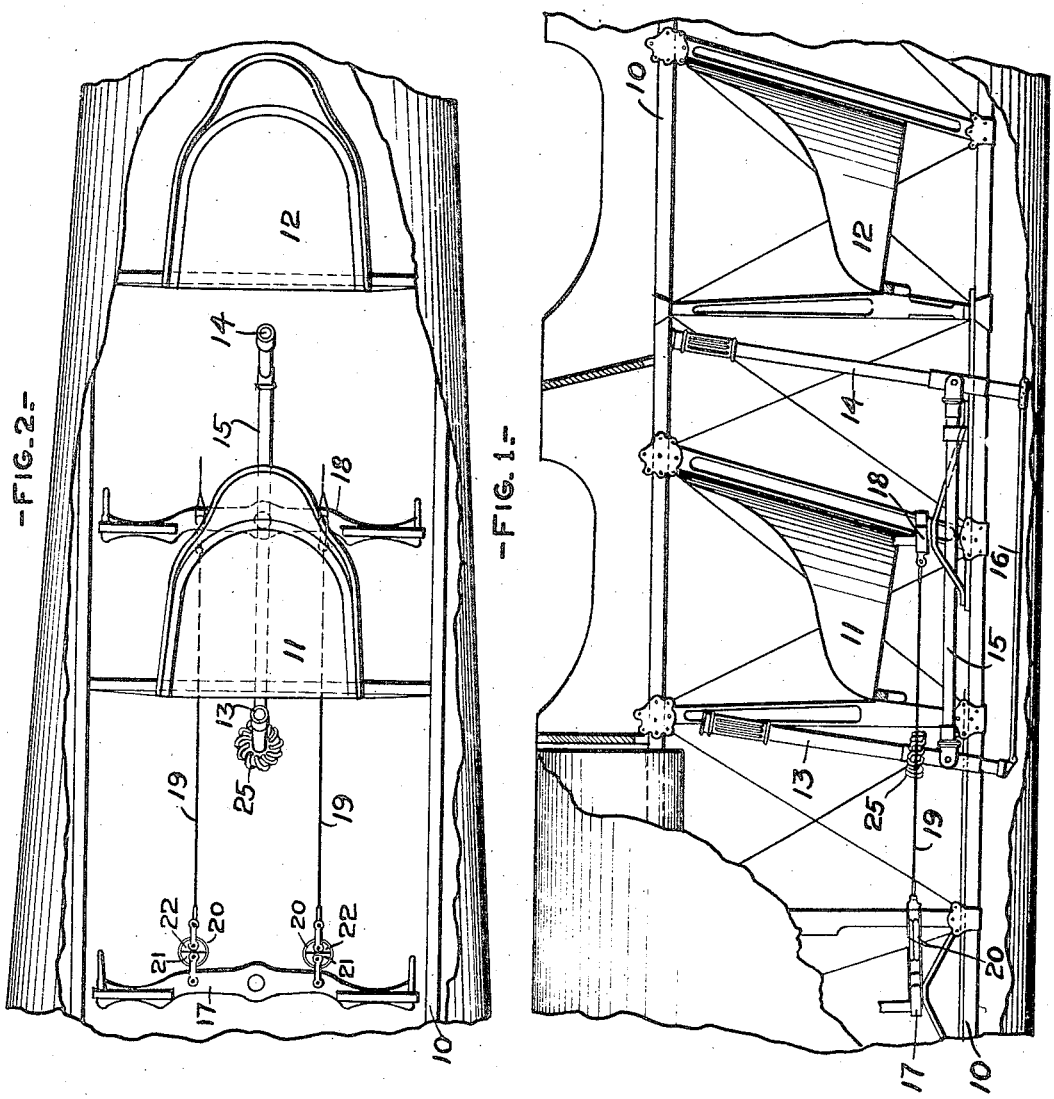

UNITED STATES PATENT OFFICE.

BENJAMIN DOUGLAS THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

DUAL CONTROL FOR AIRPLANES.

1,424,049.           Specification of Letters Patent.     Patented July 25, 1922.

Application filed July 3, 1919. Serial No. 308,584.

*To all whom it may concern:*

Be it known that I, BENJAMIN DOUGLAS THOMAS, a subject of Great Britain, and a resident of Ithaca, in the county of Tompkins and State of New York, United States of America, have invented a certain new and useful Improvement in Dual Controls for Airplanes, of which improvement the following is a specification.

This invention relates to dual control devices, and their connections, for use in airplanes, and has for its object to provide improved connections of this character, whereby one operator may assume control of the machine when the other fails to make the proper moves to do so.

In the training of aviators, it is customary to use a two-seated airplane having dual sets of control members connected together, one being handled by the instructor, and the other by the pupil. It is desirable that the pupil should be able to make such moves of his manually operated control members as he thinks are correct for properly controlling and guiding the airplane, but in case he should fail to make the proper or correct moves, the instructor should be able to instantly take the control, and make the proper moves of the controlling devices.

These dual sets of control members are usually connected together to move in unison, so that the controlling devices or surfaces may be actuated by either one of the operators. According to my invention, the connections are also such that the dual sets of control members move in unison under normal conditions and either operator may control the machine, but a yielding element is introduced in the connection to the pupil's control device, in such a manner that the instructor can, at any time, by exerting a greater than normal force, move the control devices as he wishes, notwithstanding the opposition of the pupil, the yielding element being thereby flexed to permit such operation. The yielding element is preferably elastic, and is of sufficient strength to normally transmit the movement from the pupil's control member to the control surfaces without being flexed or yielding to any appreciable extent when the control is being handled by the pupil alone, with no interference from the instructor. When, however, the instructor interferes to move his control member in a direction opposed to the action of the pupil, the greater force which he exerts to overcome the action of the pupil, operates to flex or stretch the elastic connection, and the machine is thereby subject to a safe and proper control at all times. By means of this improved connection, the pupil also learns readily, by the feeling or pull of the elastic element, to follow the movements of the instructor, and thereby soon acquires a knowledge of the proper method of control.

In the accompanying drawings: Figure 1 is a side elevation of a body or fuselage of an airplane, with parts broken away to show the control devices; Fig. 2, a plan of same; Fig. 3, a transverse section of the improved control stick, showing the connecting discs; Fig. 4, a side elevation of the same, with one part shown in section; Fig. 5, a plan showing, in detail, one of the improved elastic connections for the rudder control foot bar; and Fig. 6, a vertical section of the same.

According to the construction shown, the frame, 10, of the fuselage, or body, supports the seats, 11 and 12, for the pupil and the instructor, respectively, and there are two sets of control devices, one for each, comprising the joy, or control, sticks, 13 and 14, mounted on their respective fulcrums, at the opposite ends of the rotatable bar, 15, and also connected together at their lower ends by the bar, 16. The pilot's, or instructor's, control stick, 14, is connected in the usual way with the control surfaces, such as the elevator and the ailerons for guiding and balancing the airplane. The dual equipment also includes the two foot bars, 17 and 18, mounted on their respective fulcrums, for operation by the pupil and the instructor, respectively, and connected together on both sides of their fulcrums by the tension rods, 19. The pilot's foot bar, 18, is provided with the usual connections for operating the rudder of the airplane.

According to my improvement, one or more of the pupil's manually operated control members of the dual system, is provided with a flexible connection, which has sufficient strength and stiffness to normally hold the parts together in their usual relations, and require the two control members to move in unison when only the usual or normal amount of force is applied to properly control the airplane, but adapted to yield and permit a divergence of movement of the two members when a greater force is applied.

Various forms of connections for this purpose may be designed, but I prefer to employ an elastic element, which will not only yield under the greater force, but will also operate to automatically return the parts to the normal relative positions when such excess force is removed.

The specific form of elastic element shown in the drawing as applied to the foot bar connection, comprises an elastic or rubber cord, 20 secured around the two semicircular blocks, 21 and 22, one being connected to the pupil's foot bar, 17, and the other to the rod, 19, leading to the pilot's foot bar, 18. It will, of course, be understood that two of these elastic elements are employed, one in each of the connecting rods, 19, at either side of the central fulcrum of the foot bar.

In applying the elastic element to the pupil's control stick connection, it should be adapted to yield in either direction, that is, when the stick is moved either longitudinally, in controlling the surfaces for elevating or depressing the flight of the airplane, or laterally, in controlling the ailerons for banking and balancing the machine. According to the particular form of device shown, the control stick, 13, is formed in two sections, the upper section having a disc, 23, at its lower end, and the other section having a corresponding disc, 24, at its upper end, the two discs being secured together flatwise, by means of an elastic cord, 25, which is passed through a series of holes in said discs, and around the outside edges. This constitutes, in effect, an elastic universal joint adapted to yield in any direction, and permit a flexing of the stick when a greater than normal force is applied.

The elastic element is sufficiently stiff to hold the parts in their normal position under the usual operation of the control surfaces by the pupil, and when there is no opposition on the part of the other operator or instructor, but if he should desire to take the control from the pupil, and exerts a greater than normal force upon either of his control members, in opposition to the pupil, the elastic cord will then yield, and permit the instructor to properly control the surfaces regardless of the position in which the pupil may attempt to hold his control members. As soon as the emergency is passed, however, the instructor may then allow the pupil to resume control by merely ceasing to exert the excess force on his control members.

Having now described my invention, what I claim as new and desire to secure by Letters Patent is:

1. In an airplane, the combination of dual manual control members, one for instructor and one for pupil, and a connection between said members normally adapted to move the same in unison, said connection including an elastic element adapted to yield under a greater than normal stress, and to return to normal condition when said greater stress is removed, independently of the amount of flexure.

2. In an airplane, a control stick formed in sections having a universal joint and elastic means normally holding said sections rigidly together but adapted to yield to permit a flexing of said stick in either direction when a certain stress is applied and acting to automatically return said parts to normal position when the excess stress is removed, independently of the amount of flexure.

3. In an airplane, a control stick formed in sections, each having a disc at its end, and elastic means for securing said discs together.

4. In an airplane, a control stick formed in sections, each having a disc mounted on the adjoining ends and super-imposed one against the other, and an elastic cord securing said discs together.

5. In an airplane, the combination of two foot control bars, a connection between said foot bars, whereby the same are normally moved in unison, and an elastic element included in said connection and adapted to yield when a greater than normal stress is applied, and to return to normal condition when said stress is removed.

6. In an airplane, the combination of two foot control bars, and a connection between the same, including an elastic cord, adapted to stretch when a greater than normal stress is applied and to return to normal when said stress is removed.

7. In an airplane, the combination of two foot control bars, and a connection between the same including two blocks and an elastic cord securing said blocks together.

8. In an airplane, the combination of two control sticks, connections between the same whereby they are normally moved in unison, two foot control bars with connections for normally moving the same in unison, and elastic means included in both of said connections and adapted to yield when a greater than normal force is applied, and to return to normal when said stress is removed.

In testimony whereof I have hereunto set my hand.

BENJAMIN DOUGLAS THOMAS.